UNITED STATES PATENT OFFICE.

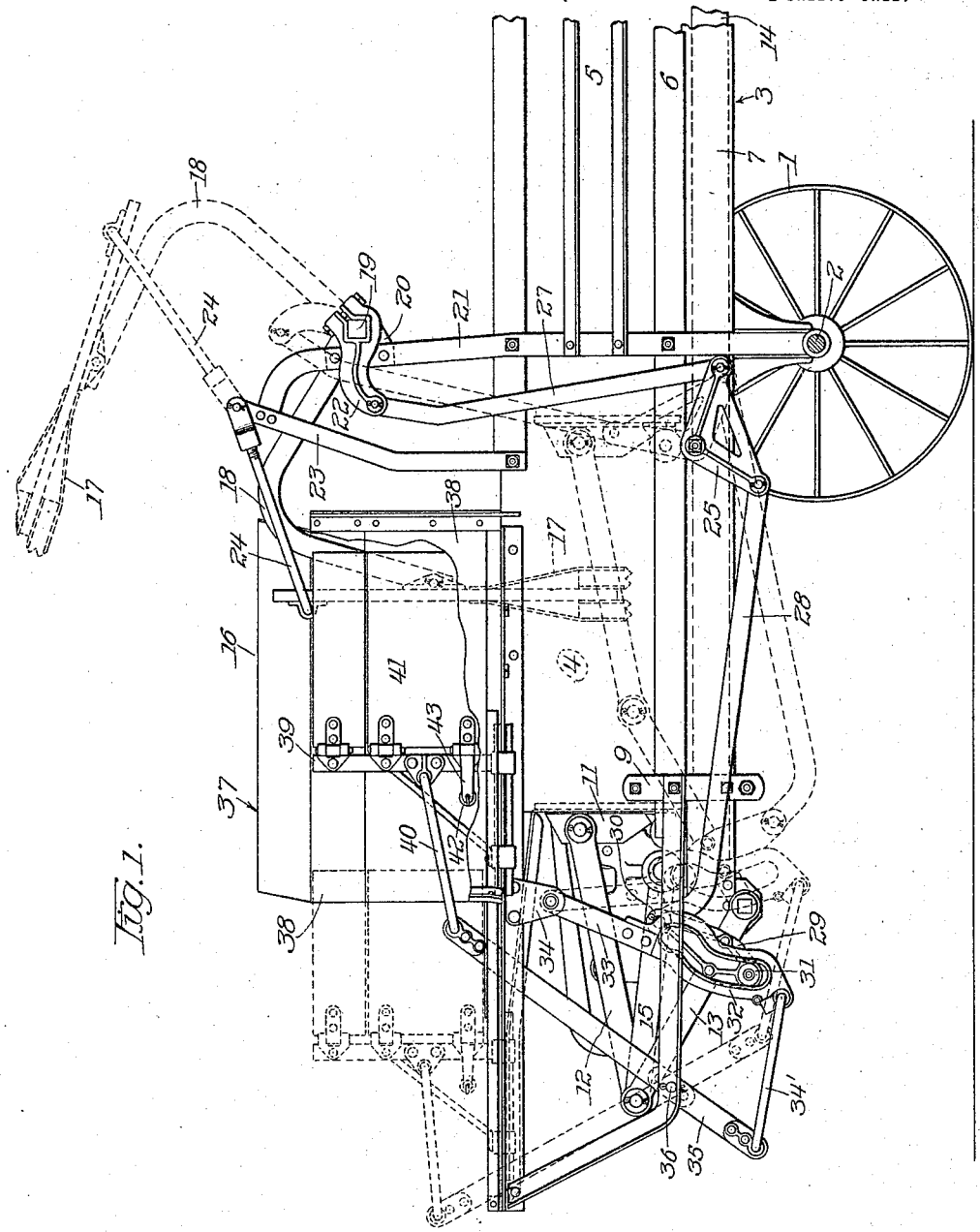

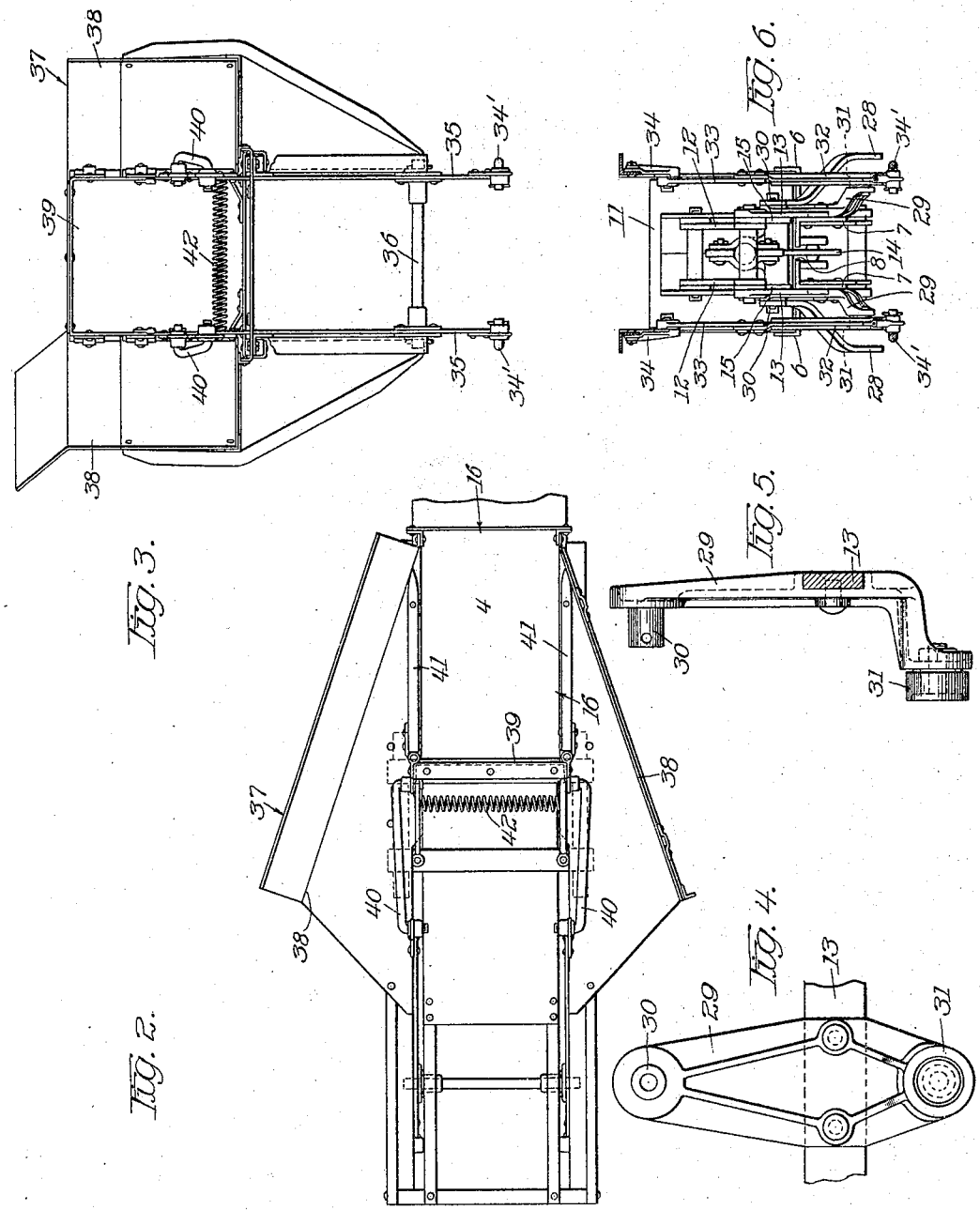

JAMES A. SHARP, OF SPRINGFIELD, OHIO, ASSIGNOR TO INTERNATIONAL HARVESTER COMPANY OF NEW JERSEY, A CORPORATION OF NEW JERSEY.

BALING-PRESS.

1,185,845.  Specification of Letters Patent.  Patented June 6, 1916.

Application filed January 8, 1914. Serial No. 811,082.

*To all whom it may concern:*

Be it known that I, JAMES A. SHARP, a citizen of the United States, residing at Springfield, in the county of Clark and State of Ohio, have invented certain new and useful Improvements in Baling-Presses, of which the following is a full, clear, and exact specification.

My invention relates to baling presses, and comprises means for operatively connecting the condenser mechanism with the operating mechanism in an improved manner whereby the movement of the condenser is positively controlled relative to the movement of the self-feeding mechanism.

The object of the invention is to provide an improved condenser actuating mechanism and one that will be positive and efficient in operation.

A further object of my invention is to provide improved operative connections for the condenser mechanism whereby the condenser, after being advanced to its condensing position, is maintained substantially stationary therein during the entry of the feeding arm into the condensing chamber in such a manner as to insure effective feeding by the feeder arm.

These objects are attained by means of mechanism, one embodiment of which is illustrated in the accompanying drawings, in which—

Figure 1 is a side elevation of part of a hay press having my invention embodied in its construction; Fig. 2 is a top plan view of the condenser mechanism; Fig. 3 is an end elevation of Fig. 2; Fig. 4 is an enlarged detail of part of the condenser and self-feeder operating mechanism; Fig. 5 is a side elevation of Fig. 4; and Fig. 6 is an end elevation of part of Fig. 1.

Referring to the drawings, wherein the same reference characters designate like parts throughout the several views, 1 represents one of the carrying wheels journaled upon an axle 2 that carries one end of the machine, comprising a frame 3, a compression chamber 4, and a baling chamber 5. The bottom of the frame is formed of corner angle bars 6 and centrally disposed, inverted, opposed angle bars 7 spaced apart in a manner forming an inverted channel with a slot 8 in the bottom thereof, and a plate 9 which supports and secures together the bars 6 and 7.

11 represents the plunger head to which is pivotally connected one end of plunger bars 12, the opposite ends of which are pivotally connected with oppositely disposed toggle bars 13 having their opposite ends pivotally connected with the rear end of the frame of the machine, constituting a toggle connection between the frame and the plunger head. A plunger draw bar 14 extends forwardly beneath the frame and has its rear end connected with a toggle joint formed by the plunger bars 12 and toggle bars 13 by means of oppositely disposed links 15.

16 represents a feed opening communicating with the compression chamber, and 17 a swinging feeder head that is pivotally connected intermediate its ends to one end of a curved arm 18, the opposite end of the arm being connected with a rock shaft 19 journaled in bearings 20 carried by vertically disposed frame members 21 secured to opposite sides of the baling chamber, and 22 represents lever arms secured to opposite ends of the rock shaft. The members 21 extend beyond the bearings 20 and curve rearward, having their upper ends secured to brace members 23 secured to the frame of the machine, and 24 represents links having one end pivotally connected with the upper ends of the members 23 and their opposite ends with the feeder head 17, whereby the position of the head is controlled as it enters the compression chamber.

25 represents bell crank levers pivotally mounted upon opposite sides of the bed frame of the machine and having one arm connected with the lever arms 22 by means of links 27, and their remaining arms to the front ends of longitudinally disposed bars 28. 29 represents bracket members secured intermediate their ends to the lower ends of the toggle members 13 adjacent their pivotal connection with the frame of the machine; the bracket members being provided at one end with laterally projecting studs 30, whereby they are pivotally connected with the rear upturned ends of the bars 28 and upon their opposite ends with rollers 31 that are received by slotted cam members 32 that have upper ends secured to the lower ends of pendent swinging bars 33, the upper ends of which are pivotally connected with bracket members 34 secured to the opposite sides of the frame of the machine; the opposite ends of the cam members being connected by means of links 34' with the lower ends of vertically disposed levers 35 carried by a transversely disposed rock shaft 36 journaled upon the rear end of the frame of the machine.

37 represents a well known form of condenser, including fixed rearwardly diverging side walls 38 and a movable rear wall including a centrally disposed transverse member 39 slidably mounted upon the frame of the machine and connected with the upper ends of levers 35 by means of links 40, and having hingedly connected with its opposite ends, swinging condenser members 41 that are held in engagement with the side walls 38 as the member 39 moves longitudinally upon the frame of the machine, by means of a tension spring 42 having its opposite ends connected with rearwardly extending arms 43 carried by the swinging members 41.

In operation, as the draw bar pulls forward upon the toggle members 13, causing them to swing upward and forward in a direction to cause the plunger head to approach the compression chamber, motion is transmitted to the bell crank levers 25 by means of the bars 28 in a direction to rock the shaft 19 forward and raise the feeder head to the position shown by dotted lines in Fig. 1, and simultaneously with such movement the levers 35 are turned about their axes by means of their link connection with the slotted cam members 32, and the movable wall of the condenser is drawn to the position shown by dotted lines in Fig. 1 to receive a charge of hay. As the feeder head rotates the material is condensed in the condenser and forced into the compression chamber.

It is to be noted that through my improved construction the condenser is moved to its condensing position while the feeder is raised, and through its operative connections is maintained in that position while the feeder moves down to compress the charge, thus insuring efficient action of the feeder and the proper condensing of the charge to be acted upon thereby.

Having illustrated and described a preferred form of my invention, I do not wish that it be confined to the precise details of construction as shown, it being understood that changes may be made in the various parts of the mechanism without departing from the spirit of my invention.

What I claim as my invention and desire to secure by Letters Patent is:

1. In a baling press, a frame, a feeder arm carried thereon, a coöperating condenser carried on said frame, operating mechanism for said feeder arm and condenser, and means for advancing said condenser to its condensing position during the initial movement of said feeder arm and maintaining said condenser stationary therein during the entry of the feeder arm into the condensing chamber.

2. In a baling press, a frame, a plunger thereon, a condenser thereon, operating mechanism for said plunger, and means operatively connected between said plunger and condenser for maintaining the latter in condensing position during a predetermined part of the movement of said plunger.

3. In a baling press, a frame, a feeder thereon, a plunger thereon, a condenser thereon, operating mechanism for said plunger and said feeder, and a plurality of substantially parallel links pivoted to said frame and operatively connected together and to said condenser moving in timed relation with said plunger and feeder and controlling the movement of said condenser.

4. In a baling press, a frame, a feeder arm thereon, a coöperating condenser thereon, and operating mechanism for the several parts whereby said condenser is moved to condensing position during the first stages of the feeding movement of said feeder arm and retained in that position during the last stages of the movement thereof and both said feeder arm and said condenser are returned automatically to their initial positions.

5. In a baling press, a frame, a feeding chamber thereon, a condenser, a reciprocating plunger, operating mechanism therefor, a depending swinging cam pivoted on said frame, operative connections between said cam and said plunger, and link connections pivoted on said frame and operatively connected to said cam and said condenser whereby the latter is moved to condensing position and maintained stationary therein during a portion of the movement of said plunger.

6. In a baling press, a frame, a feeder arm thereon, a coöperating condenser thereon, a plunger, operating mechanism for said plunger, operating mechanism for said feeder arm moving in timed relation with said plunger, and means operatively connected to said plunger operating mechanism and operating in timed relation with said feeder arm operating mechanism whereby said condenser is moved into and maintained substantially stationary in its condensing position while said feeder arm is making its feeding stroke and is withdrawn therefrom as said feeder arm returns from its feeding stroke.

7. In a baling press, a frame having a compression chamber therein, a plunger reciprocable in said chamber, a depending swinging cam member pivoted on said frame, operative connections between said cam and said plunger, a movable condenser mounted on said frame, a link pivotally connected at a point intermediate its ends to said frame, and operative connections between one end of said link and said condenser and between the other and said cam.

8. In a baling press, a frame having a compression chamber therein, a plunger reciprocable in said chamber, a depending swinging cam member pivoted on said frame, operative connections between said cam and said plunger, a movable condenser carried on said frame, a link pivotally connected at a point intermediate its ends to said frame, operative connections between the opposite ends of said link and said condenser and cam, and feeding mechanism movable in timed relation with said plunger and operatively connected thereto.

9. In a baling press, a frame, a condenser including a movable wall, a plunger head, means for actuating said head including swinging toggle members pivotally connected with said frame and upon its opposite sides, means for moving said movable wall including swinging slotted cams pivotally connected with said frame, rollers carried by said toggle members and received by said cams, vertically arranged levers pivotally connected intermediate their ends with said frame, and link connections between the lower ends of said levers and said cams and between their upper ends and said movable wall of the condenser.

10. In a baling press, a frame, a condenser including a movable wall, a plunger head, means for actuating said head including swinging toggle members pivotally connected with said frame and upon its opposite sides, means for moving said movable wall including swinging slotted cams pivotally connected with said frame, brackets carried by said toggle members, rollers journaled upon said brackets and received by said cams, feeder mechanism including a rock shaft, and operative connections between said rock shaft and said brackets and between said movable wall of the condenser and said slotted cams.

11. In a baling press, a frame, a feed opening, a feeder arm, a condenser coöperating with said feeder arm and including fixed and swinging side walls, a slidable end wall having said swinging walls hingedly connected therewith, a plunger head, swinging toggle members pivotally connected with said frame upon opposite sides thereof, and operatively connected with said head, slotted cams pivotally connected with said frame and movable longitudinally thereof, rollers carried by said toggle members and received by said cams, vertically disposed levers pivotally connected intermediate their ends with said frame, link connections between the lower ends of said levers and said cams, and link connections between their upper ends and the slidable end wall of said condenser.

12. In a baling press, a frame, a feed opening, a feeder arm, a condenser coöperating with said feeder arm and including fixed and swinging side walls, a slidable end wall having said swinging walls hingedly connected therewith, a plunger head, swinging toggle members pivotally connected with said frame upon opposite sides thereof and operatively connected with said head, pendent bars having their upper ends pivotally connected with said frame in a manner to swing longitudinally and in a vertical plane, a pair of slotted cams disposed upon opposite sides of the frame and having their upper ends secured to the lower ends of said pendent bars, rollers carried by said toggle members and received by said cams, vertically disposed levers pivotally connected intermediate their ends with said frame, link connections between the lower ends of said lever and said cams, and link connections between their upper ends and the slidable end wall of said condenser.

In testimony whereof I affix my signature, in the presence of two witnesses.

JAMES A. SHARP.

Witnesses:
R. M. HOLLENBECK,
M. M. MORROW.

Copies of this patent may be obtained for five cents each, by addressing the "Commissioner of Patents, Washington, D. C."